US012595155B2

(12) United States Patent
Herkel et al.

(10) Patent No.: US 12,595,155 B2
(45) Date of Patent: Apr. 7, 2026

(54) ELEVATOR SYSTEMS

(71) Applicant: Otis Elevator Company, Farmington, CT (US)

(72) Inventors: Peter Herkel, Berlin (DE); Dirk H. Tegtmeier, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 1176 days.

(21) Appl. No.: 17/529,500

(22) Filed: Nov. 18, 2021

(65) Prior Publication Data

US 2022/0380175 A1 Dec. 1, 2022

(30) Foreign Application Priority Data

May 28, 2021 (EP) .................................... 21176737

(51) Int. Cl.
*B66B 5/02* (2006.01)
*B66B 1/28* (2006.01)
(Continued)

(52) U.S. Cl.
CPC ................ *B66B 5/027* (2013.01); *B66B 1/28* (2013.01); *B66B 1/3492* (2013.01); *B66B 3/002* (2013.01); *B66B 13/146* (2013.01); *B66B 9/00* (2013.01)

(58) Field of Classification Search
CPC ......... B66B 5/027; B66B 1/28; B66B 1/3492; B66B 3/002; B66B 13/146; B66B 9/00; B66B 5/02; B66B 11/0226; B66B 13/16
See application file for complete search history.

(56) References Cited

U.S. PATENT DOCUMENTS 6,494,296 B2 12/2002 Lindegger et al.
2010/0187047 A1* 7/2010 Gremaud ............... B66B 5/027 187/351

(Continued)

FOREIGN PATENT DOCUMENTS

CN 102076593 A 5/2011
CN 107810157 A 3/2018

(Continued)

OTHER PUBLICATIONS

European Search Report for application EP 21176737, dated Nov. 3, 2021, 71 pages. (Previously Submitted).

(Continued)

*Primary Examiner* — Jeffrey Donels
(74) *Attorney, Agent, or Firm* — CANTOR COLBURN LLP

(57) ABSTRACT

An elevator system includes a hoistway (217) including a landing (225A-225C), which includes a landing door (227A-227C), an elevator car (203), comprising an elevator car door (229), arranged to move within the hoistway (217), a first safety switch (231; 233) configured to indicate a potential hazard in the elevator system (201) and a controller (215). The controller (215) is configured, when the first safety switch (231; 233) is triggered, to stop movement of the elevator car (203) and determine whether the elevator car (203) is located anywhere within an unlocking zone (253) in the hoistway. The controller is further configured, if it is determined that the elevator car (203) is located anywhere in the unlocking zone (253), to allow the elevator car door (229) and landing door (227A-227C) to be opened.

12 Claims, 8 Drawing Sheets

(51) Int. Cl.

| | |
|---|---|
| ***B66B 1/34*** | (2006.01) |
| ***B66B 3/00*** | (2006.01) |
| ***B66B 9/00*** | (2006.01) |
| ***B66B 13/14*** | (2006.01) |

(56) References Cited

U.S. PATENT DOCUMENTS

| | | | | |
|---|---|---|---|---|
| 2018/0162692 | A1* | 6/2018 | Herkel | B66B 1/36 |
| 2023/0109720 | A1* | 4/2023 | Roussel | B66B 3/002<br>187/325 |

FOREIGN PATENT DOCUMENTS

| | | | | |
|---|---|---|---|---|
| CN | 111824872 | A | 10/2020 | |
| EP | 1369372 | A1 * | 12/2003 | B66B 3/00 |
| EP | 1533266 | A2 * | 5/2005 | B66B 13/24 |
| EP | 3003946 | A1 | 10/2018 | |
| EP | 3003946 | B1 * | 10/2018 | B66B 5/027 |
| EP | 3502033 | A1 * | 6/2019 | B66B 13/146 |

OTHER PUBLICATIONS

European Search Report for application EP 21176737, dated Nov. 3, 2021, 71 pages.

* cited by examiner

ELEVATOR SYSTEMS

FOREIGN PRIORITY

This application claims priority to European Patent Application No. 21176737.1, filed May 28, 2021, and all the benefits accruing therefrom under 35 U.S.C. § 119, the contents of which in its entirety are herein incorporated by reference.

TECHNICAL FIELD

This disclosure relates to elevator systems and methods which are directed towards addressing the issue of passengers being trapped in an elevator car following the triggering of a safety switch.

BACKGROUND ART

In prior art elevator systems, when an elevator car is stopped due to a potential hazard within the elevator system, irrespective of where the elevator car is stopped, the opening of the elevator car door and landing door is prevented. As a result, any passengers within the elevator car are trapped therein, typically until a maintenance engineer takes appropriate action. It is often the case that the elevator car is stopped a short distance from the landing doors. Clearly, the trapping of passengers within the elevator car is not desirable and thus it would be advantageous to provide an elevator system which addresses the problem outlined above.

SUMMARY OF THE DISCLOSURE

In accordance with a first aspect, the present disclosure provides an elevator system comprising: a hoistway comprising a landing which comprises a landing door; an elevator car, comprising an elevator car door, arranged to move within the hoistway; a first safety switch configured to indicate a potential hazard in the elevator system; and a controller configured, when the first safety switch is triggered, to: stop movement of the elevator car; determine whether the elevator car is located anywhere within an unlocking zone in the hoistway; and if it is determined that the elevator car is located anywhere in the unlocking zone, to allow the elevator car door and landing door to be opened.

It will thus be appreciated that aspects of the present disclosure provide an improved elevator system whereby even when the elevator car is stopped due to a potential hazard, the elevator door and landing door will be allowed to be opened if the elevator car is in the unlocking zone. The unlocking zone may thus comprise a region of space in the hoistway whereby when the elevator car is located within said improved elevator system may reduce the occurrence of situations whereby passengers are trapped in the elevator car. If it is determined that the elevator car is not within the unlocking zone, the controller may be configured to prevent the elevator door and landing door from being opened.

The unlocking zone may only comprise a portion of space within the hoistway whereby when the elevator car is present therein, a car floor of the elevator car, and a landing floor of the landing, are aligned. However, in a set of examples, the landing comprises a landing floor, the elevator car comprises a car floor, and wherein the unlocking zone comprises a first portion space within the hoistway whereby, if the elevator car is present therein, the car floor and landing floor are aligned; and a second portion of space within the hoistway whereby, if the elevator car is present therein, the car floor and landing floor are misaligned. Accordingly, as will be appreciated, in such examples, the elevator door and landing door may be allowed to be opened even when the car floor and landing floor are misaligned, thereby potentially further minimising the number of occurrences of passengers being trapped in the elevator car. The alignment and misalignment mentioned above refers to vertical alignment and misalignment, i.e. whether the car floor and landing floor are vertically aligned or vertically misaligned. When the car floor and landing floor are aligned, they are in the same horizontal plane, and when the car floor and landing floor are misaligned, they each extend in different horizontal planes.

As will be appreciated, the unlocking zone may incorporate a second portion of space within hoistway above and/or below the first portion whereby the car floor and landing floor are aligned, i.e. it will include portion of space whereby the car floor and landing floor would be misaligned if the elevator car was located therein. The extent of the unlocking zone, e.g. the extent of the second portion of space which defines the amount by which the car floor and landing floor may be misaligned, may be defined in advance. For example, the second portion of space within the hoistway may include a region of space whereby, when the elevator car is present therein, the car floor and landing floor are misaligned by up to 400 mm, e.g. up to 350 mm, e g up to 300 mm, e.g. up to 250 mm, e.g. up to 200 mm, e.g. up to 150 mm, e.g. up to 100 mm The second portion of space may comprise a region of space whereby the car floor and landing floor are misaligned by at least 10 mm, e.g. at least 15 mm, e g at least 20 mm In normal operation a car is typically considered to be aligned when the car floor and landing floor are aligned to within 10 mm. Often a relevelling is performed when the misalignment exceeds 20 mm. In at least some examples, the second portion of space within the hoistway may include a region of space whereby, when the elevator car is present therein, the car floor and landing floor are misaligned by at least 30 mm, e g at least 40 mm, e.g. at least 50 mm. Such examples may represent a misalignment that is too great to be addressed by a relevelling operation and hence the passengers would be trapped in the car without the elevator door and landing door being allowed to open in the unlocking zone.

The unlocking zone may extend above and/or below a particular landing floor such that the elevator car door and landing door can still be allowed to open even if the car floor is above or below the landing floor. The unlocking zone may be symmetrically distributed above and below a landing floor such that the amount of misalignment between the car floor and landing floor above and below may be the same. However, this is not essential, and in alternative examples, the unlocking zone may be unequally distributed such that the unlocking zone allows the car floor and landing floor to be misaligned to a larger extent in one direction compared to the other. For example, it may be easier for a passenger to step down out of an elevator car than it is for the passenger to step up out of an elevator car. As such, the unlocking zone may be defined such that it extends to a larger extent upwards such that the misalignment of the elevator car when stopped above the landing floor may be larger than when the elevator car is stopped below the landing floor.

The first portion of space may comprise a region of space in the hoistway whereby the car floor and landing floor are completely aligned. The first portion of space may also comprise a region of space whereby the car floor and landing floor misaligned by only a small amount, for example misaligned by up to 20 mm. In this case, a small misalignment of up to 20 mm, for example, may be considered to be aligned, even though the car floor and landing floor do not extend in the exact same horizontal plane.

The extent of the unlocking zone may depend on particular characteristics of the elevator system. The extent of the unlocking zone, i.e. the size of the unlocking zone, may also be adjustable so that it can be adjusted for a particular elevator system.

When it is determined that the elevator car is in the unlocking zone, the controller will allow the elevator car door and landing door to be opened. For example, the controller may release any locks which prevent the opening of the elevator car door and landing door. The controller may also be configured to open the elevator car door and landing door. If it is determined that the elevator car is not within the unlocking zone, then the elevator car door and the landing door may be prevented from being opened.

Whilst it is desirable to minimise the number of instances whereby passengers are trapped within the elevator car, there may be some potential hazards within the elevator system which mean that it is inappropriate to allow the elevator car door and landing door to be opened, irrespective of whether the elevator car is in the unlocking zone. Thus, in a set of examples, the first safety switch indicates a first category of potential hazard within the elevator system, and wherein the elevator system further comprises a second safety switch configured to indicate a second category of potential hazard within the system, and wherein the controller is configured to stop movement of the elevator car when the second safety switch is triggered and configured to prevent the opening of the elevator car door and landing door irrespective of whether the elevator car is in the unlocking zone.

Accordingly, when the second safety switch is triggered, in addition to stopping the elevator car, the controller prevents opening of the elevator car door and landing doors. The first category of potential hazard may include any hazard which would not necessarily preclude the exiting of the elevator car. Types of first safety switches which may indicate such a first category of potential hazard may include, for example, landing door contact switches, overspeed safety switches and limit switches. A door contact switch or overspeed switch may, for example, be triggered by a passenger shaking the elevator car. For example, overspeed safety switches may be triggered by a passenger jumping in the elevator car. The second category of potential hazard, indicated by the second safety switch being triggered, may be a potential hazard which means that a passenger cannot safely exit the elevator car. As an example, the second safety switch may comprise an emergency-stop switch arranged on a roof of the elevator car, for use by a maintenance engineer. When such a switch is operated, the maintenance engineer may manually override the elevator system and, for example, drive the elevator car to move vertically within the hoistway. As will be appreciated, in such situations, it would not be safe for a passenger to exit the elevator car. Other examples of such second safety switches include inspection switches whereby a maintenance engineer may set the switch to inspection mode. The controller being configured to operate differently depending on whether it is the first safety switch or second safety switch which has been triggered may therefore minimise the number of trapped passenger situations, whilst simultaneously ensuring the safety of the passengers in the elevator car.

The controller may be suitably configured to determine which safety switch has been triggered, i.e. to determine the type of potential hazard indicated, and to perform the appropriate action. The first safety switch and second safety switch may be suitably connected to the controller such that the controller is able to determine which safety switch has been triggered. For example, the first safety switch may be connected to a first port of the controller, and the second switch may be connected to a second port of the controller. The controller may store which port each of the safety switches is connected to and thus be capable of determining which safety switch has been triggered depending on which port receives a signal. In addition, or alternatively, when triggered, the first safety switch or second safety switch may output to the controller an identification indicating which type of safety switch it is and/or the type of potential hazard detected.

As will be appreciated, there may be a plurality of first safety switches which indicate a first category of potential hazard and similarly there may be a plurality of second safety switches which indicate a second category of potential hazard. At least two of the plurality of first safety switches may have different forms, but nonetheless indicate a first category of potential hazard. For example, one first safety switch may be a physical limit switch and a further first safety switch may be a virtual safety switch. The first category of potential hazard may be considered to be a hazard which is sufficiently concerning that movement of the elevator car should be stopped, but which alone should not prevent the opening of the elevator car door and the landing door.

Similarly, at least two of the plurality second safety switches may have different forms, for example one such second safety switch may comprise an emergency-stop switch located on the roof of the elevator car, and a further such second safety switch may comprise an emergency-stop switch located in the pit of the hoistway. Nonetheless, both such second safety switches indicate a second category of potential hazard whereby it is not safe to allow the elevator car door and landing door to be opened.

In any of the examples described above, the first safety switch and/or the second safety switch could be a physical switch, for example a limit switch arranged in the hoistway, or a virtual switch embedded in software within the elevator system, for example in the controller. For example, a virtual safety switch may comprise suitable software which monitors the speed of the elevator car or the current draw of an elevator machine which operates to drive the elevator car. Such a virtual safety switch may be configured to be triggered, for example, when it detects that the elevator car is moving too fast, or when the elevator machine is drawing too much current.

In a set of examples, the first safety switch is configured such that it is triggered when the elevator car moves into a position whereby the elevator car floor and landing floor are misaligned. The landing may be a target landing, i.e. the landing door at which it is intended to stop the elevator car, and thus the triggering of the first safety switch may indicate that the elevator car has passed its target destination and therefore there is a potential problem, and thus potential hazard, within the elevator system.

In a set of examples, the triggering of the first safety switch indicates that the elevator car is at a particular position within the hoistway and wherein the controller determines whether the elevator car is within the unlocking zone based on the triggering of the first safety switch. The first safety switch may be positioned such that when triggered, the position of the elevator car is known based on the position of the first safety switch. The controller may then use this position to determine whether or not the elevator car is within the unlocking zone. The controller may be configured to take the position, and compare it to a range of positions of the unlocking zone to determine whether the elevator car is within the unlocking zone. However, it may be the case that the first safety switch is configured such that its triggering, alone, is indicative that the elevator car is within the unlocking zone and thus its triggering may indicate to the controller that the elevator car is within the unlocking zone. For example, the safety switch may be configured such that it is triggered when the elevator car moves a pre-set distance past a landing floor. In this case, the pre-set distance may be such that it is known that when the first safety switch is triggered the elevator car will be at a position within the unlocking zone.

The first safety switch may be a virtual safety switch embedded within software of the elevator system. For example, the safety system may comprise a position reference system which indicates the position of the elevator car within the hoistway. Virtual safety switches may be set to correspond to set positions within the elevator hoistway. When the position reference system determines that the elevator car has reached such a set position, the virtual safety switch may then be triggered.

However, in a set of examples, the first safety switch is a physical switch arranged in the hoistway. The physical switch may comprise a limit switch. In such examples, the first safety switch may be triggered by the elevator car, or an object present thereon, as the elevator car reaches the first safety switch in the hoistway. The use of a physical safety switch may advantageously provide a reliable indication as to the position of the elevator car within the hoistway, and thus provide an indication as to whether the elevator car is located in an unlocking zone.

The first safety switch may be configured to indicate the position of the elevator car at any suitable position within the hoistway. In a set of examples, the landing is a terminal landing of the hoistway, and wherein the first safety switch is a final limit switch configured to indicate the elevator car has reached a final limit of the hoistway. Accordingly, when the final limit switch is triggered, it is known that the elevator car should not travel any further within the hoistway and should therefore be stopped as further travel would present a possible hazard. The final limit switch may be in the form of a physical switch arranged in a specific position such that when triggered, it is indicative of the position of the elevator car, and hence the car floor, within the hoistway. The final limit switch may be positioned such that when triggered, it is indicative of a position in the hoistway which is within the unlocking zone. The terminal landing may be an upper or lower terminal landing.

The final limit switch may be arranged, for example, on a wall of the hoistway, at a position vertically above or below the terminal landing door depending on whether it is an upper terminal landing door or a lower terminal landing door. In addition, or alternatively, the final limit switch may be arranged on a buffer arranged at the bottom of the hoistway.

As described above, the position of the elevator car within the hoistway may be indicated based on the triggering of the first safety switch. However, the position of the elevator car may be determined by alternative means. In a set of examples, the elevator system further comprises a position reference system configured to output a position of the elevator car within the hoistway, and wherein the controller is configured to determine whether the elevator car is in the unlocking zone using the position output by the position reference system. Such a position reference system may be particularly useful in examples whereby the first safety switch does not indicate the position of the elevator car. For example, the first safety switch may comprise an overspeed switch which simply triggers when the car is travelling too fast. Such a switch may not be capable of indicating the position of the elevator car and thus the controller may not be able to determine whether the elevator car is located in the unlocking zone based on the triggering of the first safety switch. By using the position of the elevator car provided by the position reference system, it may be possible for the controller to determine whether the elevator car is within the unlocking zone.

The position, alone, output by the position reference system may be used to determine whether the elevator car is in the unlocking zone. However, in some examples, the position reference system may be used together with a first safety switch which when triggered indicates the position of the elevator car within the hoistway. The combination of both may advantageously provide a more accurate and reliable indication of the position of the elevator car and thus ensure that the elevator car door and landing door are only opened when it is actually safe to do so. For example, even though a safety switch itself may be capable of providing an indication of the position of the elevator car within the hoistway, the elevator car may move slightly after triggering the first safety switch, e.g. due to an inherent stopping distance of the moving elevator car and/or potential problems within the elevator system which may have caused the elevator car to trigger the first safety switch in the first place. Accordingly, use of the position reference system may provide a more accurate indication of the elevator car's position.

The position reference system may be any position reference system that is capable of outputting a position of the elevator car within the hoistway. For example, the position reference system may comprise an encoder provided with the elevator machine, which is capable of outputting a position of the elevator car within the hoistway based on measurements related to the movement of a part of the elevator machine. However, in a set of examples, the position reference system is an absolute position reference system. The use of an absolute position reference system may advantageously provide a highly accurate position of the elevator car within the elevator hoistway. As a result, the position of the elevator car may be determined to a high accuracy, and the elevator car door and landing door will then only be opened in instances whereby the elevator car is actually within the unlocking zone.

The absolute position reference system may comprise any system which is capable, during normal operation, of providing an absolute position of the elevator car within the hoistway. It may, for example, comprise an optical or magnetic position reference system arranged in the hoistway. For example, the position reference system may comprise an optical, e.g. camera-based, readout system. Such a system may comprise a series of markings, e.g. a code pattern, along the length of the hoistway, along with a camera arranged on the elevator car and configured to read the markings so as to enable determination of the absolute position of the elevator car within the hoistway.

In an alternative example, the position reference system could comprise a magnetic-based system. Such a magnetic system may comprise a magnetic coded tape that runs along the length of the hoistway. The magnetic tape may be read, e.g. decoded, using at least one, e.g. a plurality of, Hall sensor(s) arranged on the elevator car, so as to determine the absolute position of the elevator car within the hoistway. Of course, any other suitable means may be used to enable determination of the absolute position of the elevator car within the hoistway. The position reference system may also comprise an encoder arranged to monitor movement of an elevator machine. The encoder may be arranged to work in conjunction with the absolute position reference system to provide an actual position of the elevator car within the hoistway.

When the elevator car is in the unlocking zone and in a position where the car floor and landing floor are misaligned, there may be a small step which a passenger has to step up or down, in order to exit the elevator car. Such a step would not normally be present during normal operation of the elevator system and may thus take the passenger by surprise. Accordingly, in a set of examples, the elevator system further comprises a warning device configured to generate a warning indicating that the car floor and landing floor are misaligned.

The generation of a warning indicating the misalignment of the car floor and the landing floor may advantageously minimise the likelihood of a passenger tripping due to the misalignment as they leave the elevator car. This may thus improve the safety of the elevator system. The warning device may comprise any suitable means for generating a warning to a passenger of the elevator car. The warning device may be configured to generate an audible and/or visual warning to a passenger. The warning device may, for example, comprise a speaker configured to output an audible warning. The audible warning may comprise spoken words which explain that there is a misalignment of the elevator door and landing door and to take care when exiting the elevator car. In addition, or alternatively, the warning device may comprise means for generating a visual warning, e.g. through (a) suitably illuminated light(s), or through the use of a display screen. For example, the light may flash to indicate the presence of a misalignment. In the case of a display screen, the display screen may display a warning thereon. The warning may include text as well as a visual representation of the hazard presented by the misalignment between the elevator car door and landing door. The warning may only be generated when the elevator car door and landing door are opened. In addition or alternatively, the warning may be generated prior to the opening of the doors so as to provide an advanced warning for the passengers.

In a set of examples, the elevator car comprises a car operating panel and the warning device is integrally provided with the car operating panel. The car operating panel may be used by passengers within the elevator car to control the elevator system. For example, the car operating panel may comprise at least one input means, e.g. button(s), which a user may interact with in order to control operation of the elevator car. For example, the input means may allow a user to select a destination floor which they wish to travel to. Integrally providing the warning device with the car operating panel may advantageously minimise the amount of hardware which is present in the elevator car.

In any of the examples explained above, the first safety switch and the second safety switch (where provided) may be part of a safety chain of the elevator system.

The controller may be a safety controller which also forms part of the safety chain. The elevator car and landing may each comprise multiple doors. For example, the elevator car may comprise a front door and a back door. Each door may also comprise multiple door leaves. The hoistway may comprise a plurality of landings, and each of the landings may comprise its own unlocking zone. The unlocking zone for each landing may be identical, or the unlocking zone for each landing may differ, for example depending on the location of the landing. To determine whether the elevator car is in an unlocking zone, a reference point on the elevator car may be used, and it may be determined whether the reference point is within the unlocking zone. For example, the reference point may be the base of the elevator car. The position of the unlocking zone within the hoistway may therefore depend on the reference point which is used. Of course, any suitable reference point may be used and the unlocking zone may be positioned accordingly depending on the reference point.

In accordance with a further aspect of the present disclosure there is provided a method of operating an elevator system, wherein the elevator system comprises a hoistway comprising a landing, which comprises landing door, and an elevator car, comprising an elevator car door, which is arranged to move within the hoistway, the method comprising: stopping movement of the elevator car when a potential hazard is detected; determining whether the elevator car is located within an unlocking zone, within the hoistway,; and allowing the elevator car door and landing door to be opened if the elevator car is anywhere within the unlocking zone.

In a set of examples, the landing comprises a landing floor, the elevator car comprises a car floor, and the unlocking zone comprises a first portion of space within the hoistway whereby, if the elevator car is located therein, the car floor and landing floor are aligned, and a second portion of space within the hoistway whereby, if the elevator car is located therein, the car floor and landing floor are misaligned.

In a set of examples, the method further comprises: determining whether the potential hazard is a first category of potential hazard or a second category of potential hazard; wherein if the potential hazard is a first category of potential hazard, allowing the elevator car door and landing door to be opened if the elevator car is in the unlocking zone; and wherein if the potential hazard is a second category of potential hazard, preventing the elevator car door and landing door from being opened.

In a set of examples, the method further comprises issuing a warning to the passenger in the elevator car when the elevator door and landing door are misaligned.

Advantages of the elevator system detailed above equally apply to the method and associated examples set out herein. Similarly, features of the elevator system described above may also be applied to the method and associated examples set out above. For example, the method may utilise a controller, a first safety switch, a second safety switch, a position reference system, and/or a warning device in performing the relevant steps of the method, in the manner described above with reference to the elevator system. For example, the method may utilise a first safety switch or a position reference system to determine whether the elevator car is within the unlocking zone.

According to another aspect of the present disclosure there is provided a computer program product comprising computer-executable instructions, optionally embodied in a non-transitory computer readable medium, which, when read by a machine, cause the machine to perform the method according to any one of the examples described above.

According to a further aspect of the present disclosure there is provided a (non-transitory) computer readable medium having the computer program product as described above stored therein.

BRIEF DESCRIPTION OF THE DRAWINGS

Certain examples of the present disclosure will now be described with reference to the accompanying drawings, in which.

DETAILED DESCRIPTION

Figure 1:
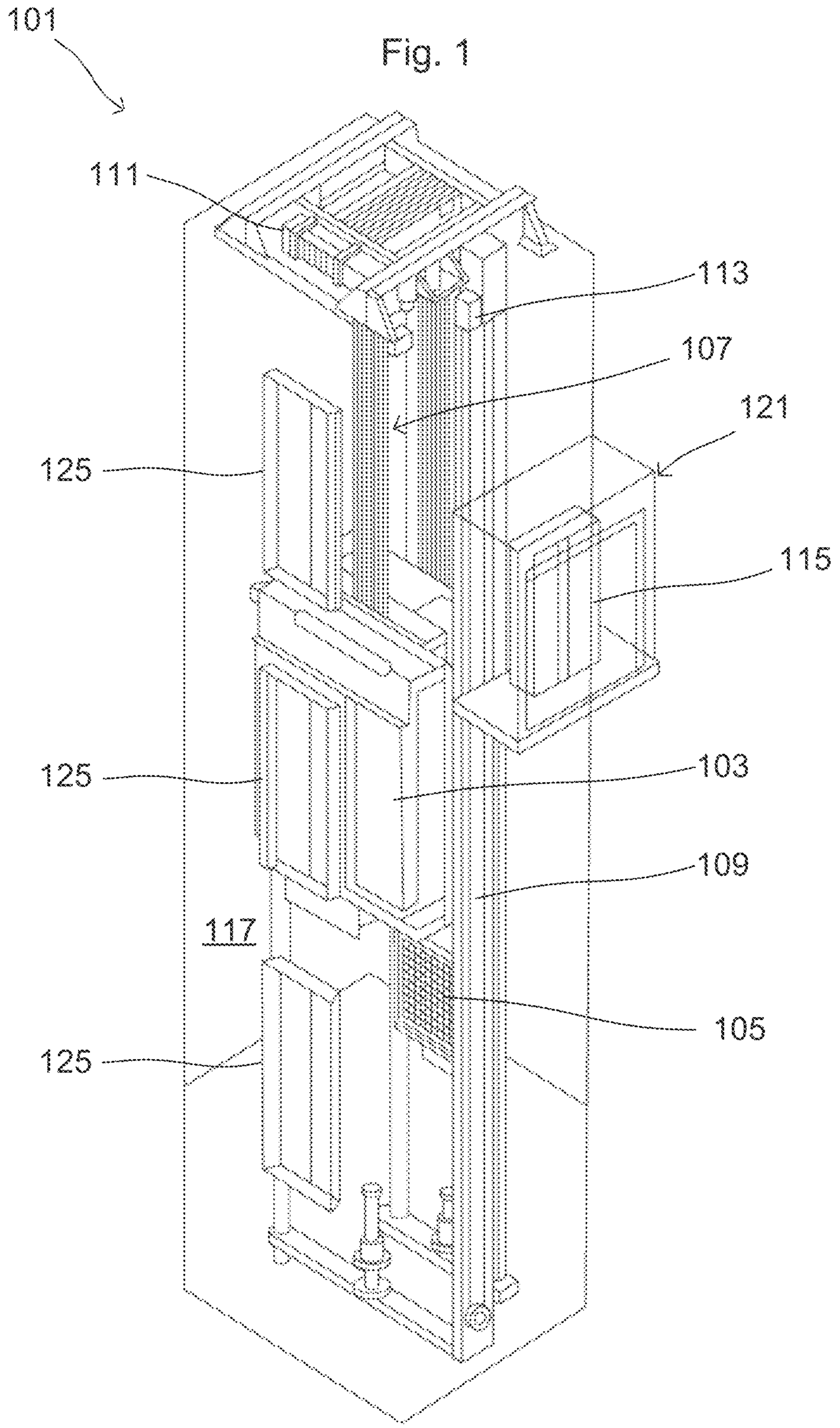
FIG. 1 is a schematic illustration of an elevator system that may employ various examples of the present disclosure.

FIG. 1 is a schematic illustration of an elevator system that may employ various examples of the present disclosure.

FIG. 1 is a perspective view of an elevator system 101 including an elevator car 103, a counterweight 105, a tension member 107, a guide rail 109, an elevator machine 111, an encoder 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within a hoistway 117 and along the guide rail 109.

The tension member 107 engages the elevator machine 111, which is part of an overhead structure of the elevator system 101. The elevator machine 111 is configured to control movement between the elevator car 103 and the counterweight 105, and thus control the position of the elevator car 103 within the hoistway 117. The encoder 113 may be mounted on a fixed part at the top of the hoistway 117, such as on a support or guide rail, and may be configured to provide position signals related to a position of the elevator car 103 within the hoistway 117.

In other embodiments, the encoder 113 may be directly mounted to a moving component of the elevator machine 111, or may be located in other positions and/or configurations as known in the art. The encoder 113 can be any device or mechanism for monitoring a position of an elevator car and/or counter-weight, as known in the art.

The controller 115 is located, as shown, in a controller room 121 of the hoistway 117 and is configured to control the operation of the elevator system 101, and particularly the elevator car 103. For example, the controller 115 may provide drive signals to the elevator machine 111 to control the acceleration, deceleration, levelling, stopping, etc. of the elevator car 103. The controller 115 may also be configured to receive position signals from the encoder 113 or any other desired position reference device. When moving up or down within the hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. The controller 115 may, for example, be located remotely or in the cloud.

The elevator machine 111 may include a motor or similar driving mechanism. The elevator machine 111 may be configured to include an electrically driven motor. The power supply for the motor may be any power source, including a power grid, which, in combination with other components, is supplied to the motor. The elevator machine 111 may include a traction sheave that imparts force to tension member 107 to move the elevator car 103 within hoistway 117.

Although shown and described with a roping system including a tension member 107, elevator systems that employ other methods and mechanisms of moving an elevator car within a hoistway may employ embodiments of the present disclosure. For example, examples may be employed in ropeless elevator systems using a linear motor to impart motion to an elevator car. Examples may also be employed in ropeless elevator systems using a hydraulic lift to impart motion to an elevator car. FIG. 1 is merely a non-limiting example presented for illustrative and explanatory purposes.

Figure 2:
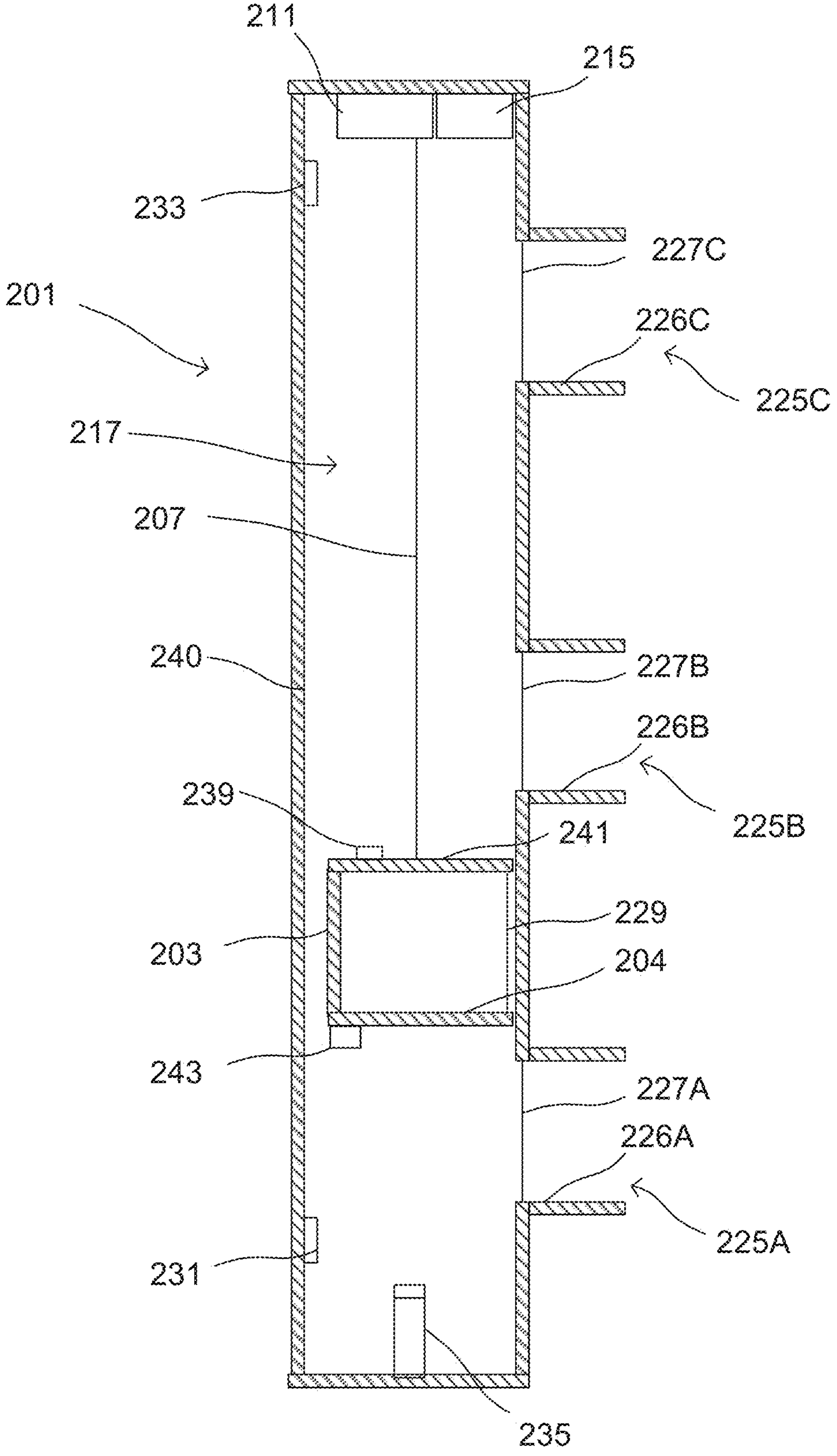
FIG. 2 is a schematic illustration of an elevator system in accordance with an example of the present disclosure.

FIG. 2 depicts an elevator system 201 in accordance with an example of the present disclosure. The elevator system 201 shown in FIG. 2 may employ any of the features of the elevator system 101 described above with respect to FIG. 1. The elevator system 201 comprises a hoistway 217 which comprises a lower terminal landing 225A, an intermediate landing 225B and an upper terminal landing 225C. The lower terminal landing 225A comprises a landing floor 226A and a landing door 227A, the intermediate landing 225B comprises a respective landing floor 226B and a landing door 227B and the upper terminal landing comprises a respective landing floor 226C and a landing door 227C. Whilst in the example depicted the elevator system 201 comprises three landings 225A-225C, it will be appreciated that this is just for illustration purposes and the elevator system 201 may comprise any suitable number of landings.

As depicted, an elevator car 203, which comprises an elevator car door 229, is arranged to move within the hoistway 217. The elevator car 203 comprises a car floor 204. The elevator car 203 is coupled to a tension member 207 which is coupled to an elevator machine 211 arranged at the top of the hoistway 217. The elevator machine 211 is configured to move the elevator car 217 by moving the tension member 207. A controller 215 controls operation of the elevator machine 211, the elevator car 203, including the elevator car door 229, as well as operation of the landing doors 227A-227C. The controller 215 may be distributed in any suitable manner so as to control the components of the elevator system 201.

The elevator system 201 further comprises a first safety switch 231, which is in the form of a final limit switch, arranged in the hoistway 217. As depicted, the first safety switch is located in a region of the hoistway 217 a short distance below the landing floor 226A of lower terminal landing 225A. In the example depicted, the first safety switch 231 is a physical switch which is triggered as the elevator car 203 moves into the space in the hoistway 217 where the safety switch 231 is located.

Another first safety switch 233, which is also a final limit switch, is arranged in an upper portion of the hoistway 217, a short distance above the top of the landing door 227C of the upper terminal landing 225C. Accordingly, the first safety switches 231, 233, are arranged to detect when the elevator car 203 has moved past the landing doors 227A, 227B, respectively, to a position whereby the car floor 204 and landing floor 226A, 226C are misaligned. The first safety switch 231 and the further first safety switch 233 may detect the presence of the elevator car 203 via any suitable means. For example, the first safety switches 231, 233 may comprise a mechanical element which is triggered by the elevator car 203, when the elevator car 203 reaches the respective first safety switches 231, 233.

Alternatively, the first safety switches 231, 233 may comprise a contactless means for detecting the presence of the elevator car 203. For example, the first safety switches 231, 233 may comprise an optical or magnetic detection means. The first safety switches 231, 233 may also be configured as virtual safety switches which are embedded within software within the elevator system 201, e.g. the controller 215.

The first safety switches 231, 233 are positioned in a pre-set position such that the triggering of either of these first safety switches also indicates the position of the elevator car 203 in the hoistway 217. As such, the elevator controller 215 may be able to determine whether the elevator car is within an unlocking zone based the first safety switch 231, 233 which is triggered. Triggering of the first safety switches 231, 233 indicates a first category of potential hazard in the elevator system.

As depicted, a buffer 235 is located at the bottom of the hoistway 217. Another safety switch may be arranged on the buffer 237, such that if the elevator car 203 contacts the buffer 235, the safety switch is triggered. Such a safety switch may be a first safety switch, i.e. indicate a hazard which does not alone preclude the elevator car door and landing door from being opened.

A second safety switch 239 is arranged on the roof 241 of the elevator car 203. The second safety switch 239 may be an emergency-stop switch, which can be triggered by a maintenance engineer when present on the roof 241 of the elevator car 203. Triggering of the second safety switch 239 indicates a second category of potential hazard within the elevator system whereby it is not safe for the elevator door 229 and landing door 227A-227C to be opened.

An absolute position reference system 243 is arranged on the elevator car 203. Whilst an absolute position reference system 243 is depicted and described below, it will be appreciated that any other form of position reference system may be utilised instead. The absolute position reference system 243 may, for example, comprise an optical or magnetic absolute position reference system as described above. In such examples, a visual or magnetic code may be provided on the wall 240 of the hoistway 217 and a suitable detector for reading the code may be present on the elevator car 203. The absolute position reference system 243 may thus be capable of outputting a position of the elevator car 203 within the hoistway 217.

The first safety switches 231, 233, the second safety switch 239, and the absolute position reference system 243, may all be connected to the controller 215 via any suitable means, e.g. a wired, or wireless connection.

Figure 3:
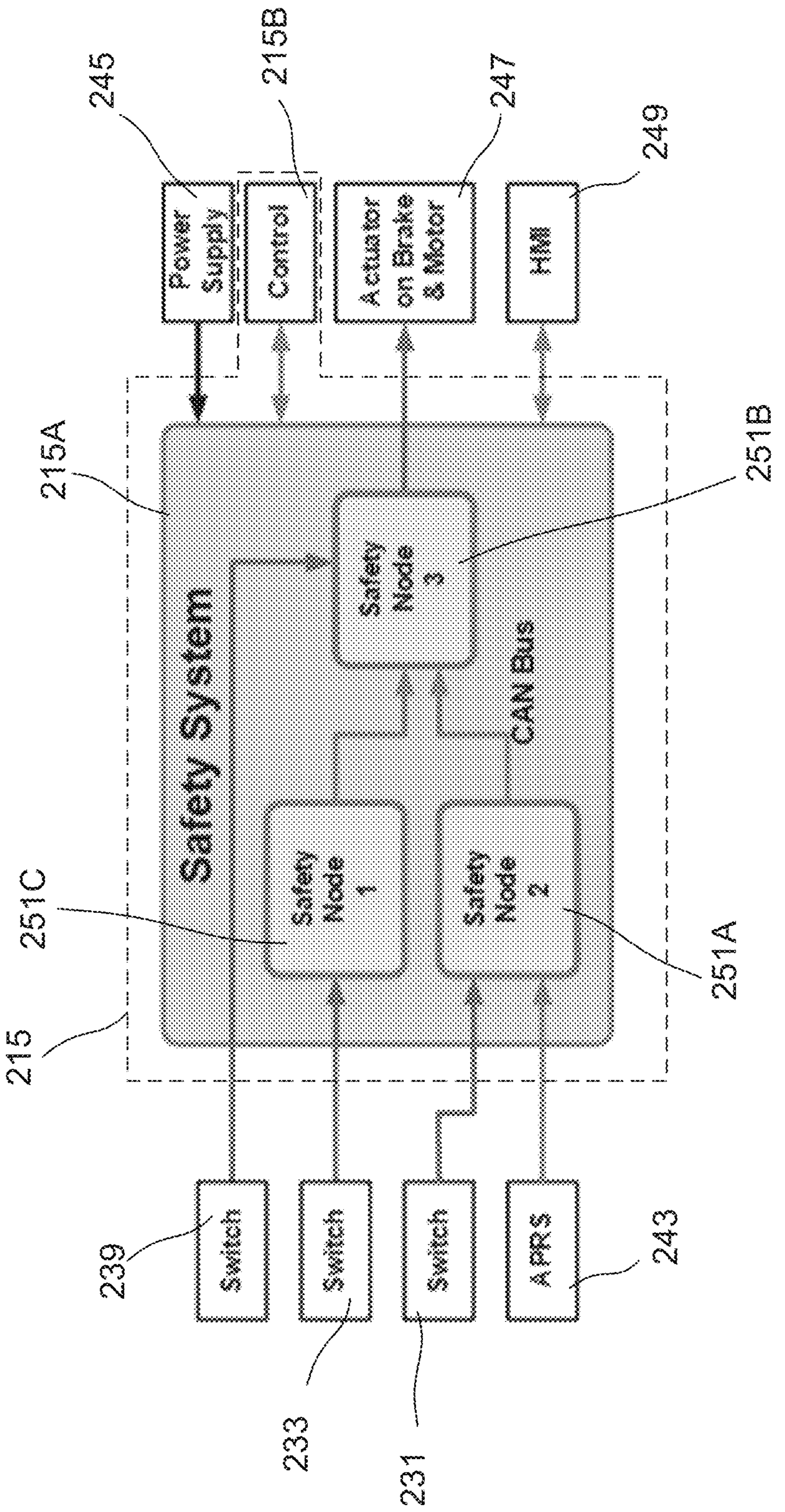
FIG. 3 is schematic illustration showing the connection between various components of the elevator system shown in FIG. 2.

FIG. 3 shows a schematic illustration of the connection of some of the components of the elevator system 201. As depicted, the controller 215, indicated by the dashed line, may be subdivided into a safety controller 215A, which monitors first safety switches 231, 233, second safety switch 239 and absolute position reference system 243, and a general controller 215B which controls operation of the elevator system 201, e.g. the elevator machine 211 etc. Of course, any suitable distribution of the controller 215 may be provided as long as it is able to function in the manner described. In the example depicted, the safety controller 215A, first safety switches 231, 233, second safety switch 239 and position reference system 243 form a safety chain.

A power supply 245 provides power to the safety controller 215A. The power supply 245 may also supply power to the general controller 215B and other components of the elevator system 201. Of course, a separate dedicated power supply may be provided for each of the safety controller 215A and the general controller 215B. As depicted, the safety controller 215A is coupled to an actuator 247 on an emergency brake (not depicted) and the motor (not depicted) of the elevator machine 211. As such, the safety controller 215A is able to stop movement of the elevator car 203 through operation of the actuator 247. A human machine interface (HMI) 249 is also provided and coupled to the safety controller 215A. The HMI 249 may allow an on-site person, e.g. a maintenance engineer, to interact with the safety controller 215A. For example, it may allow a safety engineer to reset the safety controller 215A, thereby allowing the elevator car 203 to move, once any issue has been resolved.

As depicted, the first safety switches 231, 233, second safety switch 239, and absolute position reference system 243 are coupled to safety nodes 251A, 251B, 251C within the safety controller 215A. Of course the system may comprise any suitable number of safety nodes. Each of the safety nodes 251A, 251B, 251C may separately process the output from its respective safety switch 231, 233, 239, or absolute position reference system 243. The safety nodes 251A, 251B, 251C are connected within the safety controller 215A by a Controller Area Network (CAN) Bus. A CAN is not essential and any other communication means may be employed.

The safety controller 215A may store an association between the first safety switches 231, 233 and their respective positions in the hoistway, as well as the positions which define an unlocking zone for each of the landings 225A-225C. The safety controller 215A may be configured that if either of first safety switches 231, 233 is triggered, it instantly knows that the elevator car 203 will be within an unlocking zone due to the positioning of the first safety switches 231, 233. However, the safety controller 215A may also store positions which define the unlocking zone such that a position determined from a first safety switch 231, 233, or from the position reference system 243 can be compared to the positions which define the unlocking zone so as to determine whether the elevator car 203 is in an unlocking zone.

Figure 4:
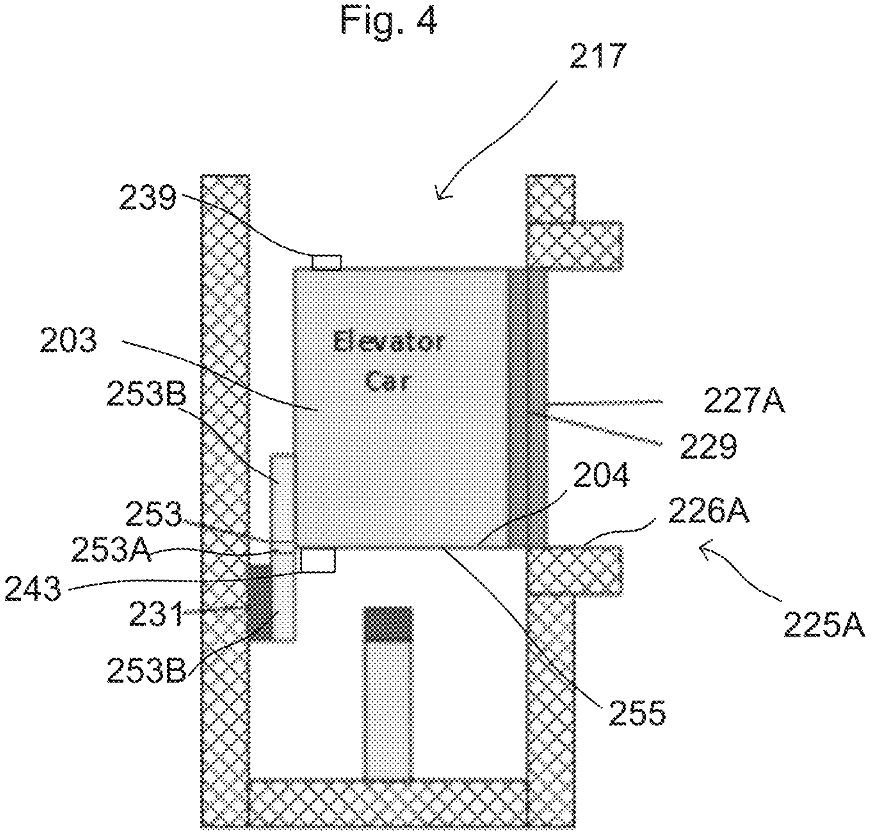
FIG. 4 is a schematic illustration showing the elevator car of FIG. 2 aligned with a landing.

Operation of the elevator system 201 according to an example of the present disclose will now be described with reference to FIGS. 4-8. FIG. 4 is a view of the elevator system 201, depicted in FIG. 2, focussing on the lower terminal landing 225A. In the illustration shown in FIG. 4, the elevator car 203 is at a position within the hoistway 217 whereby it is aligned with the lower terminal landing 225A such that the car floor 204 and landing floor 226A are fully aligned. When in this position, assuming that the second safety switch 239 has not been triggered, then the elevator car door 229 and landing door 227 will be free to be opened and closed in the normal manner Whilst the safety switch 231 has not been triggered in the position shown in FIG. 4, another safety switch within the elevator system 201 could be triggered whilst the elevator car 203 is in this position. For example, a first safety switch indicating that the elevator car 203 has been overloaded with passengers may be triggered. If such a safety switch is triggered, the controller 215 may determine whether the elevator car 203 is within an unlocking zone 253. In the example depicted, the unlocking zone 253 is depicted as a vertical region within the hoistway 217 wherein if the bottom 255 of the elevator car 203 is within this unlocking zone 253, then it will be possible to open the elevator door 229 and the landing door 227A, of course depending on which safety switch has been triggered. As depicted, the unlocking zone 253 incorporates a first portion of space 253A within the hoistway 217 whereby the car floor 204 and landing floor 226A are aligned, and further includes a second portion of space 253B within the hoistway 217 whereby the car floor 204 and landing floor 226A will be misaligned. As depicted, the first portion of space 253A has a small extent in the vertical direction. Accordingly, the car floor 204 and landing floor 226A may be considered to be aligned even when they are actually misaligned by a small amount. For example, the first portion of space 253A may extend 20 mm in the vertical direction and be positioned such that the car floor 204 and landing floor 226A can be offset by up to 10 mm above or below one another, and still be considered to be aligned. The unlocking zone 253 need not necessarily be defined based on a reference point on the bottom 255 of the elevator car 203 and may instead be defined based on any other suitable reference point of the elevator car 203.

In the position depicted in FIG. 4, the bottom 255 of the elevator car 203 is clearly within the unlocking zone 253 and thus the elevator door 229 and landing door 227A, whilst depicted as closed, may be opened. In the situation depicted in FIG. 4, as no safety switch has been triggered which indicates a position of the elevator car 203, the position of the elevator car 203 may be determined using the position reference system 243 and this position may be used by the controller 215 to determine whether the elevator car 203 is in the unlocking zone.

With the elevator car 203 in the position shown in FIG. 4, a passenger may board the elevator car 203. Once the passenger has boarded, the controller 215 may instruct the elevator machine 211 to begin hoisting the elevator car 203 upwards in the hoistway 217. However, in some instances, the elevator machine 211 may fail and as a result the elevator car 203 may drop a small amount in the hoistway 217.

Figure 5:
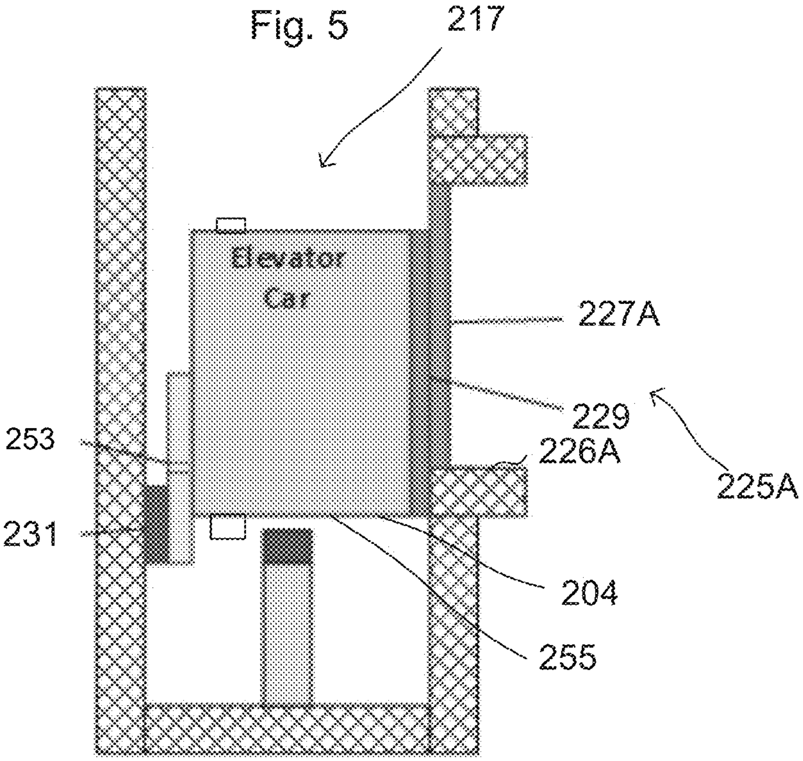
FIG. 5 is a schematic illustration showing the elevator car of FIG. 2 misaligned with a terminal landing and with the elevator car door and landing door closed.

This is depicted in FIG. 5. As shown in FIG. 5, the elevator car 203 has moved past the landing floor 226A of the lower terminal landing 225A such that the car floor 204 and landing floor 226A are no longer fully aligned. The elevator car door 229 and landing door 227A are still closed at the instant in time depicted in FIG. 5. As illustrated, the bottom 255 of the elevator car 203 is adjacent the safety switch 231 such that the safety switch 231 is triggered. As a result, the controller 215 (not visible in this Figure), stops any further movement of the elevator car 203. This may be achieved by the safety controller 215A triggering operation of the actuator 247 which operates a safety brake (not shown) on the elevator car 203 as well as a brake on the motor of the elevator machine 211.

Figure 6:
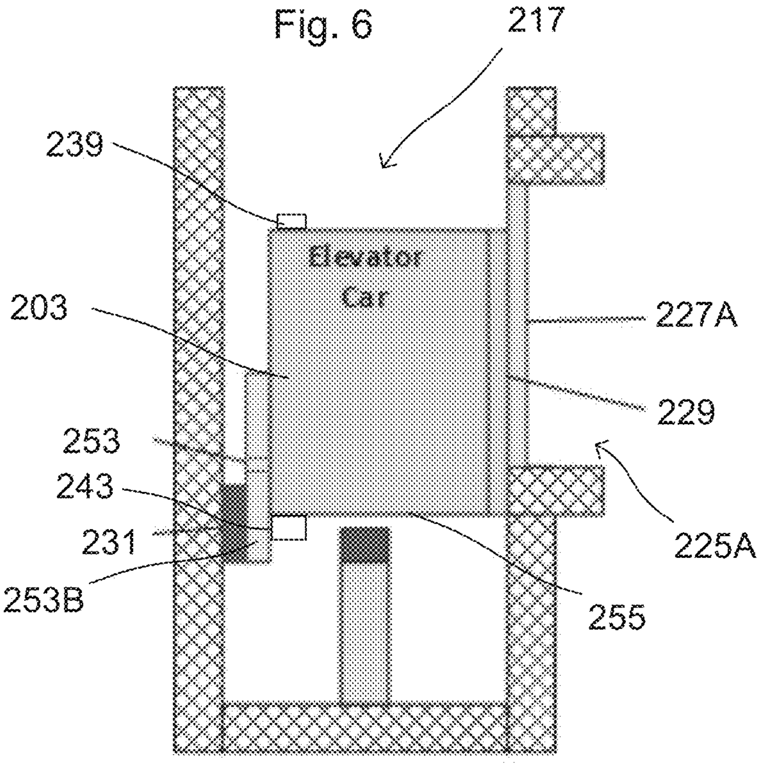
FIG. 6 is a schematic illustration of the elevator car in the same position as in FIG. 5, except with the elevator car door and landing door opened.

FIG. 6 depicts the elevator car 203 in the position shown in FIG. 5 as the controller 215 continues to operate. In this example, as it is the first safety switch 231 which has been triggered, and not the second safety switch 239, the elevator door 227A and landing door 229 are not necessarily prevented from being opened. As the first safety switch 231 has been triggered, the controller 215 may then determine whether the elevator car 203 is in the unlocking zone 253 based on a position known from the triggering of the first safety switch 231. As depicted, the bottom 255 of the elevator car 203 is within the unlocking zone 253, specifically in the second portion of space 253B. As a result, the controller 215 allows the elevator car door 229 and the landing door 227A to be opened. Advantageously, despite the misalignment, any passengers are still able to leave the elevator car 203, and trapping of the passengers is avoided. If, however, it was determined that the elevator car 203 was not within the unlocking zone 253, the controller 215 would prevent the opening of the landing door 229 and landing door 227A.

In the example above, when determining whether the elevator car 203 is within the unlocking zone 253, the position of the elevator car 203 within the hoistway may be determined using the first safety switch 231 and/or a position output by the absolute position reference system 243, as explained previously.

Figure 7:
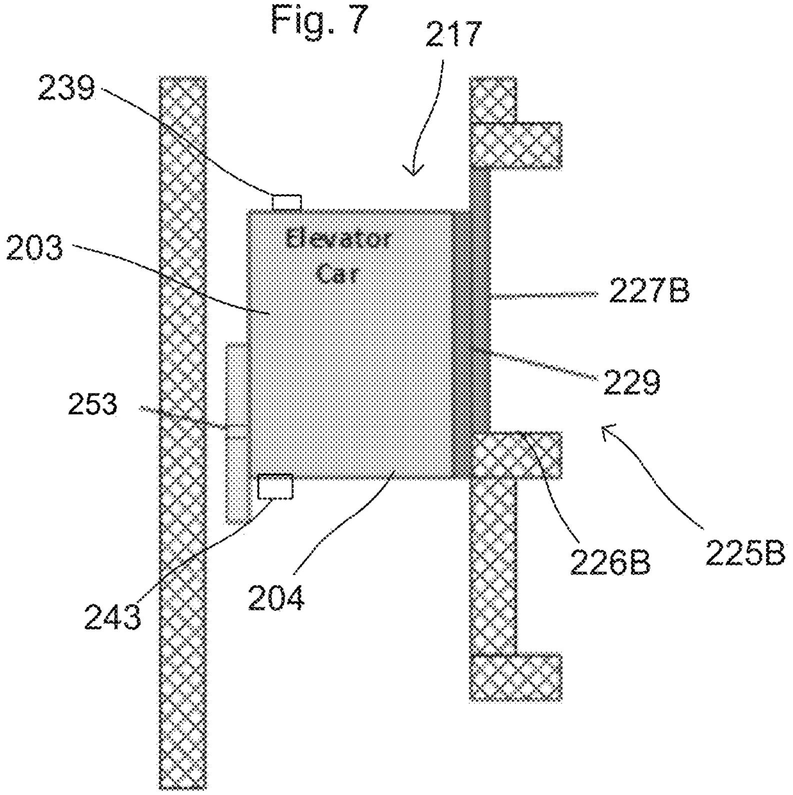
FIG. 7 is a schematic illustration showing the elevator car of FIG. 2 misaligned with an intermediate landing with the elevator car door and landing door closed.

FIG. 7 depicts the situation whereby the elevator car 203 has travelled within the hoistway 217, has passed the intermediate landing 225B to a position whereby the car floor 204 and landing floor 226B are misaligned, and has been stopped. The elevator car 203 may have been travelling to the intermediate landing 225B, and thus a virtual safety switch (not depicted) within the elevator system 201, which operates based on a position detected of the elevator car 203, may have been triggered due to an apparent malfunction of the elevator system 201. When in this position, the elevator car door 229 and landing door 227B will initially be closed.

The virtual safety switch may be a first safety switch, i.e. indicate a first category or potential hazard.

Figure 8:
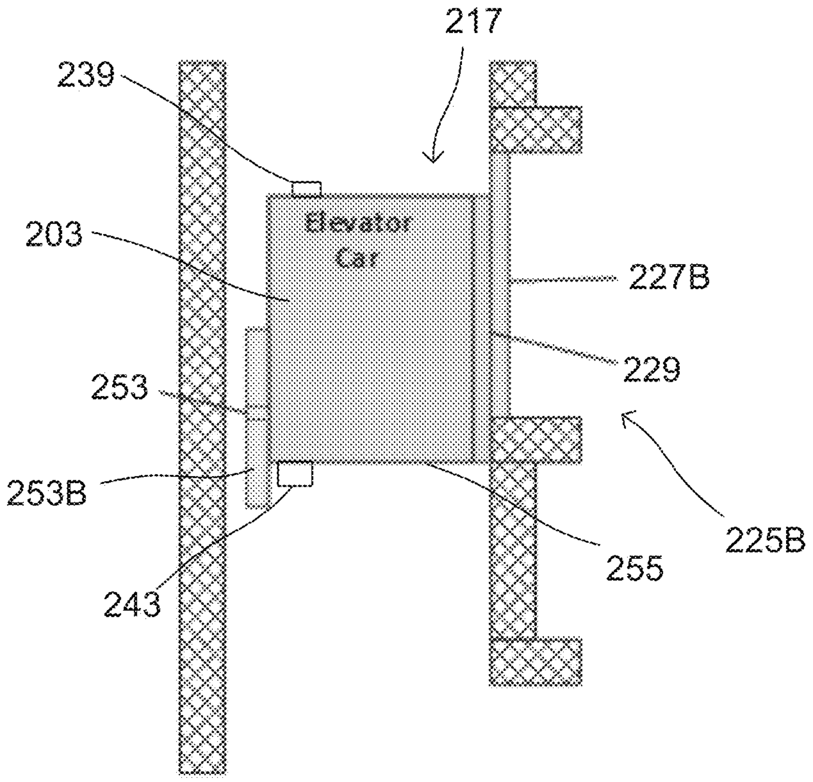
FIG. 8 is a schematic illustration showing the elevator car in the same position as in FIG. 7, except with the elevator car door and landing door opened.

As depicted in FIG. 8, the absolute position reference system 243 may be used to determine the position of the elevator car 203 within the hoistway. The absolute position reference system 243 may be capable of providing a highly accurate position of the elevator car 203 within the hoistway 217. In the example depicted in FIG. 8, the bottom 255 of the elevator car 203 is only a short distance from the intermediate landing 225B and is thus within the unlocking zone 253, specifically it is within the second portion of space 253B of the unlocking zone 253. The controller 215 may thus conclude that the elevator car 203 is within the unlocking zone 253. As such, the controller 215 may allow the elevator car door 229 and landing door 227B to be opened (as depicted in FIG. 8). Any passengers within the elevator car 203 may then be free to leave the elevator car 203 and the unnecessary trapping of the passengers is avoided even at the intermediate landing 225B.

If, in any of the examples described above, it was determined that the elevator car 203, specifically the bottom 255 thereof, was not in the unlocking zone 253, then the controller 215 may prevent the opening of the elevator car door 229 and landing doors 227A-227C. Similarly, if, in any of the examples described above, the second safety switch 239 is triggered, instead of, or in addition to any of the first safety switches 231, 233, then the controller 215 would instead prevent the opening of the elevator car door 229 and at least the relevant landing door 227A-227C. As such, the elevator car 203 would remain in the state shown in FIGS. 5 and 7 whereby the elevator car door 229 and landing door 227A, 227B remains closed. Whilst this would cause the passengers to remain trapped in the elevator car 203, it may ensure the safety of the passengers in the presence of the second category of potential hazard. The elevator car door 229 and landing door 227A-227C would remain closed until appropriate action is taken, e.g. by a maintenance engineer resetting the safety controller 215A through use of the HMI 249.

Figure 9:
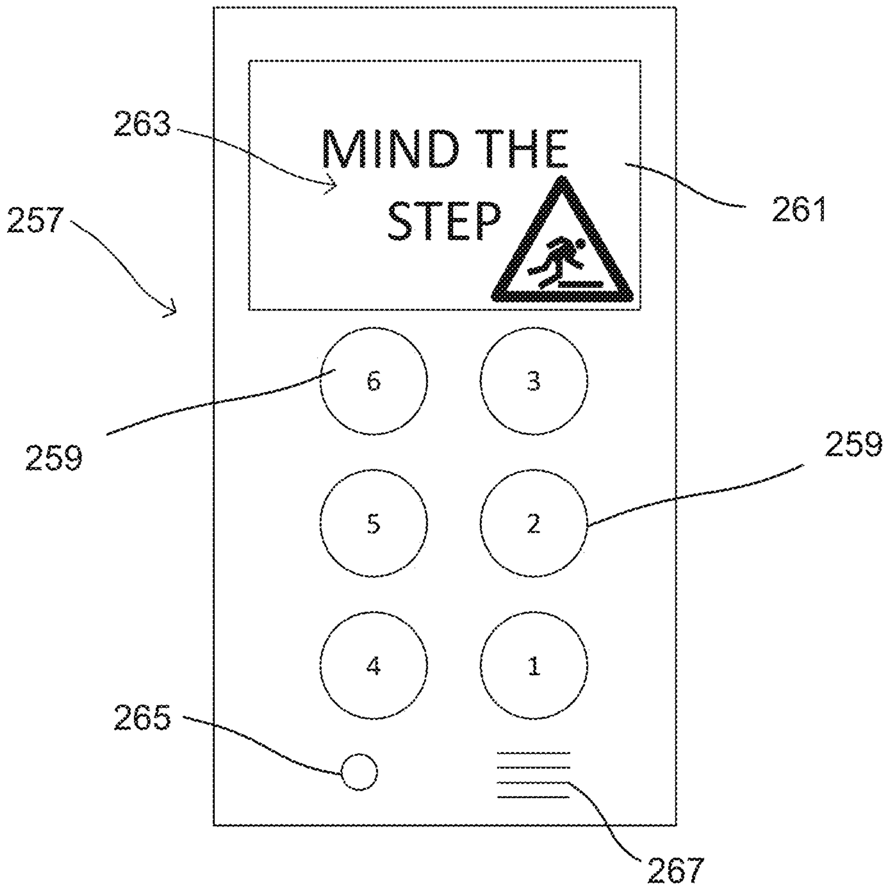
FIG. 9 is a schematic illustration of a car operating panel including a warning device.

FIG. 9 depicts a car operation panel (COP) 257 which may be present inside the elevator car 203. The COP 257 comprises an input means in the form of destination buttons 259 which a user may select in order to input a destination floor.

The COP 257 further comprises display panel 261 on which a visual warning 263 may be displayed. The visual warning 263 comprises the text "MIND THE STEP" as well as a warning image illustrating a person tripping over. Of course any other suitable visual warning 263 may be displayed. The COP 257 also comprises a light 265. In the case of misalignment between the car floor 204 and landing floors 226A-226C, the light may flash to issue a warning to the passenger within the elevator car 203. The COP 257 further comprises a speaker 267. The speaker 267 may be used to issue an audible warning of the misalignment between the car floor 204 and landing floors 226A-226C. Whilst the COP 257 illustrated comprises three different forms of means for generating a warning, the COP 257 may comprise any number and combination of suitable warning means. The COP 257 may be configured to output the warning when the elevator car door 229 and respective landing door 227A-227C is opened.

Figure 10:
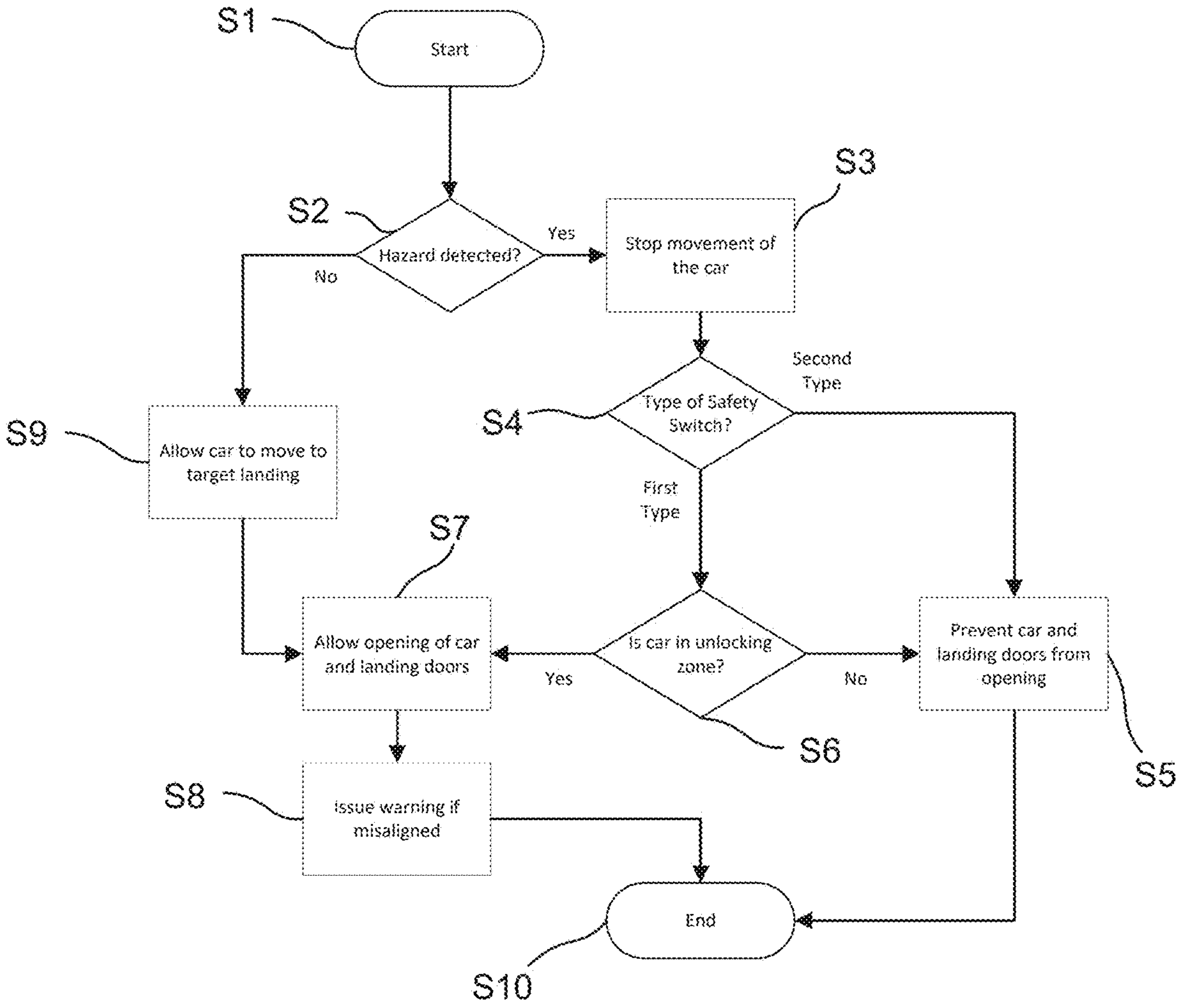
FIG. 10 is a flow chart illustrating a method in accordance with an example of the present disclosure.

FIG. 10 is a flow chart which illustrates a method in accordance with an example of the present disclosure. The method will be described with reference to the elevator system 201 described above. As depicted, the method is started at step S1. At this point, the elevator car 203 may be moving though the hoistway 217. At step S2, the method includes determining whether a potential hazard has been detected. A potential hazard may be detected, for example, based on the triggering of a first safety switch 231, 233 or a second safety switch 239. When a potential hazard is detected, the method proceeds to step S3 whereby the elevator car 203 is stopped from moving in the hoistway 217. This may involve stopping of the elevator machine 211, e.g. by engaging a brake thereon, and/or engaging a safety brake on the elevator car 203 itself. The method then proceeds to step S4 whereby the type of potential hazard is assessed. In the example depicted, it is determined which type of safety switch has been triggered. If a second safety switch 239 is triggered, i.e. a second category of potential hazard is detected whereby the elevator door 229 and landing doors 227A-227C cannot be safely opened, the method proceeds to step S5 whereby the car door 229 and landing doors 227A-227C are prevented from being opened.

However, if at step S4 it is determined that a first safety switch 231, 233 has been triggered, i.e. indicating a first category of potential hazard which does not necessarily prevent the elevator door and landing doors 227A-227C from being opened, and that no second safety switch 239 has been triggered, the method proceeds to step S6. At step S6, it is determined whether or not the elevator car 203 is within the unlocking zone 253. Determining whether the elevator car 203 is within an unlocking zone 253 may comprise determining whether the elevator car is anywhere within a first portion of space 253A whereby the car floor 204 and landing floor 226A-226C are aligned or within a second portion of space 253B whereby the car floor 204 and landing floor 226A-226C are misaligned. If the elevator car 253 is not within the unlocking zone 253, then it is concluded that it is not safe for the elevator car door 229 and the respective landing door 227A-227C to be opened, and the method proceeds to step S5 whereby the elevator car door 229 and landing door 227A-227C are prevented from being opened. If, however, the elevator car 203 is determined to be within the unlocking zone 253, the method proceeds to step S7 whereby the elevator door 229 and respective landing door 227A-227C is allowed to be opened. If the elevator door 229 and the respective landing door 227A-227C are misaligned, then the method proceeds to step S8 whereby a warning is issued informing the passenger of the misalignment before and/or after the elevator door 229 and landing door 227A-227C have been opened. Once the elevator car doors 229 and landing doors 227A-227C have been opened and the passengers have been able to leave the elevator car 203, the method ends at step S10.

If the elevator car door 229 and the landing doors 227A-227C are prevented from being opened at step S5, the method may then proceed to end at step S10. In this instance, a maintenance engineer may have to take appropriate action, e.g. to make the elevator system 201 safe so that the elevator car 203 can be moved and/or so that the passengers can leave the elevator car 203.

If, at step S2, whereby it is determined whether a hazard is detected, no hazard is detected, the method proceeds to step S9 whereby the elevator car 203 is allowed to continue moving to its target landing 225A-225C. Once the elevator car 203 has arrived at its target landing 225A-225C, assuming no other hazards are present, the elevator door 229 and the respective landing door 227A-227C is allowed to open in step S7. The method may then proceed directly to step S10, skipping step S8 where a misalignment warning is issued, and the process is ended.

In the example depicted above, the method comprises analysing the type of safety switch which has been triggered in step S4. However, in some examples, this may be optional and the method may proceed from step S3 where the elevator car 203 is stopped directly to step S6 where it is determined whether the elevator car 203 is in the unlocking zone 253. As such, steps S4 and S6 may be omitted. Such a method may be utilised when only one category of hazard is indicated by the elevator system, e.g. when the elevator system only comprises first safety switches. Similarly, the step S9 of issuing a warning is optional and may be omitted.

Accordingly, it will be appreciated by those skilled in the art that examples of the present disclosure provide an improved elevator system and method which is capable of minimising the instances whereby passengers are trapped inside an elevator car. While specific examples of the disclosure have been described in detail, it will be appreciated by those skilled in the art that the examples described in detail are not limiting on the scope of the disclosure.

What is claimed is:

1. An elevator system (201) comprising:

a hoistway (217) comprising a landing (225A-225C) which comprises a landing door (227A-227C);

an elevator car (203), comprising an elevator car door (229), arranged to move within the hoistway (217);

a first safety switch (231; 233) configured to indicate a first category of potential hazard in the elevator system (201);

a second safety switch (239) configured to indicate a second category of potential hazard within the elevator system (201); and a controller (215) configured, when the first safety switch (231; 233) is triggered, to:

stop movement of the elevator car (203);

determine whether the elevator car (203) is located anywhere within an unlocking zone (253) in the hoistway; and if it is determined that the elevator car (203) is located anywhere in the unlocking zone (253), to allow the elevator car door (229) and landing door (227A-227C) to be opened;

the controller (215) is further configured, when the second safety switch (239) is triggered, to:

stop movement of the elevator car (203); and prevent the opening of the elevator car door (229) and landing door (227A-227C) irrespective of whether the elevator car is in the unlocking zone (253).

2. The elevator system (201) of claim 1, wherein the landing (225A-225C)

comprises a landing floor (226A-226C), the elevator car (203) comprises a car floor (204), and wherein the unlocking zone (253) comprises:

a first portion space (253A) within the hoistway (217) whereby, if the elevator car (203) is present therein, the car floor (204) and landing floor (226A-226C) are aligned; and a second portion of space (253B) within the hoistway (217) whereby, if the elevator car (203) is present therein, the car floor (204) and landing floor (226A-226C) are misaligned.

3. The elevator system (201) of claim 1, wherein the triggering of the first safety switch (231; 233) indicates that the elevator car (203) is at a particular position within the hoistway (217) and wherein the controller (215) determines whether the elevator car (203) is within the unlocking zone (253) based on the triggering of the first safety switch (231; 233).

4. The elevator system (201) of claim 1, wherein the first safety switch (231; 233) is a physical switch arranged in the hoistway (217).

5. The elevator system (201) of claim 1, wherein the landing is a terminal landing (225A;225B) of the hoistway (217), and wherein the first safety switch (231; 233) is a final limit switch configured to indicate the elevator car (203) has reached a final limit of the hoistway (217).

6. The elevator system (201) of claim 1, further comprising a position reference system (243) configured to output a position of the elevator car (203) within the hoistway (217), and wherein the controller (215) is configured to determine whether the elevator car (203) is in the unlocking zone (253) using the position output by the position reference system (243).

7. The elevator system (201) of claim 6, wherein the position reference system (243) is an absolute position reference system.

8. The elevator system (201) of claim 1, further comprising a warning device (261; 265; 267) configured to generate a warning indicating that the elevator car door (229) and landing door (227A-227C) are misaligned.

9. The elevator system (201) of claim 8, wherein the elevator car (203) comprises a car operating panel (257) and the warning device (261; 265; 267) is integrally provided with the car operating panel (257).

10. A method of operating an elevator system (201), wherein the elevator system (201) comprises a hoistway (217) comprising landing (225A-225C), which comprises a landing door (227A-227C), and an elevator car (203), comprising an elevator car door (229), which is arranged to move within the hoistway (217), the method comprising:

stopping movement of the elevator car (203) when a potential hazard is detected;

determining whether the elevator car (203) is located within an unlocking zone (253) within the hoistway (217);

determining whether the potential hazard is a first category of potential hazard or a second category of potential hazard;

wherein in response to the potential hazard being a first category of potential hazard, allowing the elevator car door (229) and landing door (227A-227C) to be opened if the elevator car (203) is anywhere within the unlocking zone (253); and wherein in response to the potential hazard being a second category of potential hazard, preventing the elevator car door (229) and landing door (227A-227C) from being opened.

11. The method of claim 10, wherein the landing (225A-225C) comprises a landing floor (226A-226C), the elevator car (203) comprises a car floor (204), and wherein the unlocking zone (253) comprises:

a first portion space (253A) within the hoistway (217) whereby, if the elevator car (203) is present therein, the car floor (204) and landing floor (226A-226C) are aligned; and a second portion of space (253B) within the hoistway (217) whereby, if the elevator car (203) is present therein, the car floor (204) and landing floor (226A-226C) are misaligned.

12. A computer program product comprising computer-executable instructions, embodied in a non-transitory computer readable medium, which, when read by a machine, cause the machine to perform the method according to claim 10.

* * * * *